Oct. 30, 1951    R. N. YOUNGBLOOD ET AL    2,573,087
DEVICE FOR USE IN ASSEMBLING PARTS OF FABRICS
Filed May 15, 1947    2 SHEETS—SHEET 1
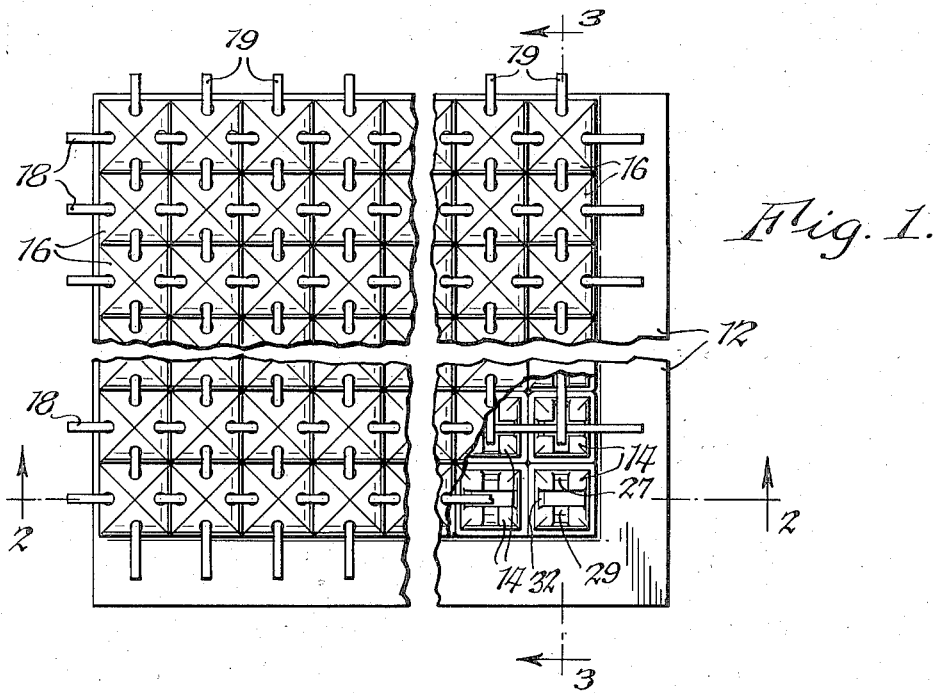
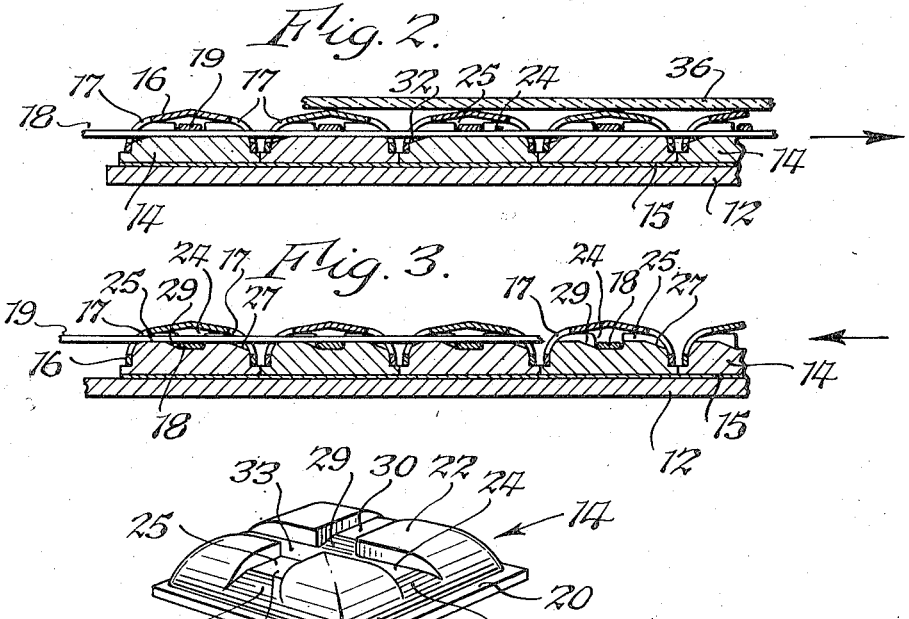
INVENTORS
Robert N. Youngblood,
Edward W. Erick
BY
Parker, Prochnow & Farmer
Attorneys.

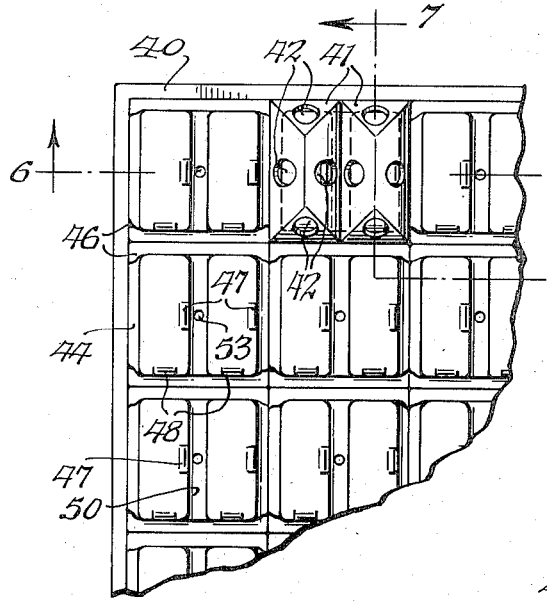
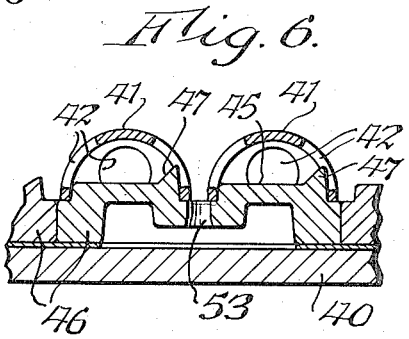
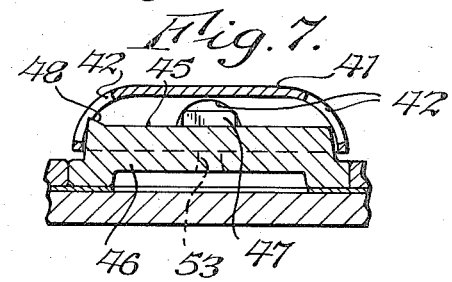
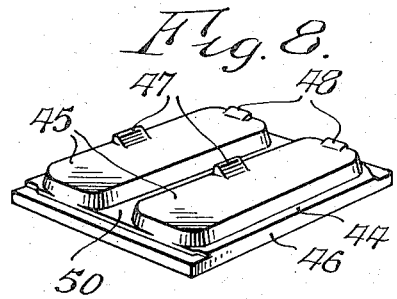
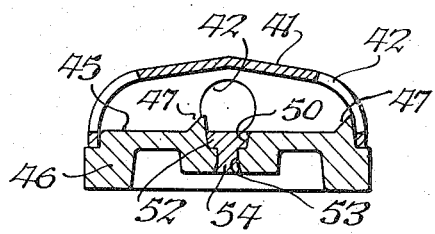
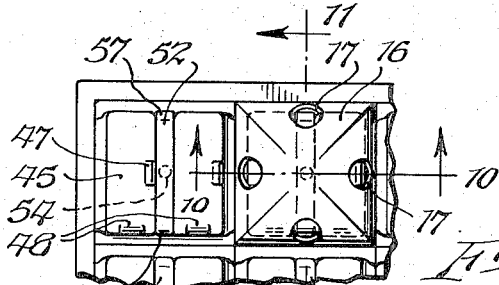
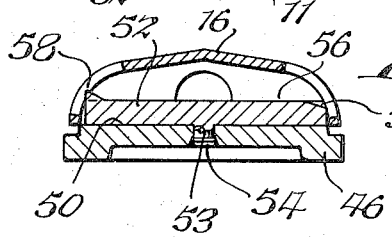

Patented Oct. 30, 1951

2,573,087

UNITED STATES PATENT OFFICE 2,573,087

DEVICE FOR USE IN ASSEMBLING PARTS OF FABRICS

Robert N. Youngblood, Snyder, and Edward W. Errick, East Aurora, N. Y., assignors, by mesne assignments, to Sterling Molders, Inc., Buffalo, N. Y., a corporation of New York Application May 15, 1947, Serial No. 748,283

2 Claims. (Cl. 29—286)

This invention relates to devices for use in connection with the assembling of units having holes therein, by means of tapes or threads passing through the holes.

One of the objects of this invention is to provide an assembly device by means of which relatively rigid units may be easily, quickly and efficiently connected by means of tapes, and in which the use of needles for guiding the tapes is eliminated. Another object of this invention is to provide a device of this type comprising a base having projecting parts thereon by means of which the units to be assembled may readily be accurately positioned in correct relation to each other and with means for guiding tapes or cords in such a manner that they will pass through the holes in the units to assemble the units.

A further object of this invention is to provide an assembly device which comprises a base having projections thereon on which the units to be assembled may be arranged in rows extending lengthwise and crosswise of the base and in which the base is provided with means extending longitudinally and crosswise thereof for guiding and supporting the tapes passing in one direction in such position that tapes passing in the other direction will not be interfered with by the first mentioned tapes. It is also an object of this invention to provide a device of this type by means of which units of different sizes may be assembled by use of the same assembly device. Another object of this invention is to provide an assembly device of this type in which the projections for the units and for guiding the tapes are formed of separate pieces secured in correct relation to each other on a supporting base.

Other objects and advantages of this invention will appear from the following description and claims.

In the accompanying drawings:

Fig. 1 is a fragmentary top plan view of an assembly device embodying this invention and showing the assembled fabric arranged thereon, the fabric being partly broken away to show the projections for supporting the units.

Figs. 2 and 3 are fragmentary sectional elevations thereof respectively on lines 2—2 and 3—3, Fig. 1, on an enlarged scale.

Fig. 4 is a perspective view of one of the unit supporting and tape guiding projections of the assembly device.

Fig. 5 is a fragmentary top plan view of an assembly device of slightly modified construction.

Figs. 6 and 7 are fragmentary sectional elevations thereof, on an enlarged scale, respectively on lines 6—6 and 7—7, Fig. 5.

Fig. 8 is a perspective view of one of the unit receiving and tape guiding projections of the assembly device shown in Figs. 5 to 7.

Fig. 9 is a fragmentary top plan view of the assembly device shown in Figs. 5 to 8 modified for the use with larger units.

Figs. 10 and 11 are sectional elevations thereof, taken respectively along lines 10—10 and 11—11, Fig. 9, on an enlarged scale.

Our invention is illustrated in the accompanying drawings for use in connection with the assembly of fabrics which include relatively rigid units which may, for example, be made of molded plastic material or of metal, and which are assembled by means of tapes to form a fabric which may be used in connection with the manufacture of ladies' handbags and other articles, but it is not intended to limit this invention to assembly devices intended for this purpose, since it will be obvious that assembly devices embodying this invention may be used in connection with the assembly of other fabrics, materials, or articles.

In the particular construction illustrated by way of example in the accompanying drawings, 12 represents a base which may be made of any suitable material which is preferably rigid and provided on the upper face thereof with a series of projections which serve to correctly locate the units to be assembled relatively to each other and with their holes in alignment. These projections may, if desired, be formed integral with the base 12, but in the construction illustrated, the projections are in the form of separate parts 14 suitably secured to the base 12. These projections 14 may, for example, be made of molded plastic material so that they will all be proper in form and so that the tape guiding portions thereof may have smooth surfaces along which the tapes will readily glide. The base 12 may be of metal or other rigid material and the projections may be applied thereto in any suitable or desired manner, for example, by means of a layer of suitable cement or adhesive 15.

The projections 14 shown in Figs. 1 to 4 are particularly adapted to cooperate with units 16 which are of dished form, those shown by way of example being substantially square in shape and being provided in their four sides with holes 17 through which the tapes 18 may pass in one direction and tapes 19 in a direction transverse to the tapes 18. The units 16 may be of any suitable or desired material, such as metal, glass, or any suitable molded plastic material and the tapes may also be of any desired material, such for example as strips of textile material coated or impregnated with a suitable plastic composition of the desired texture and color which may be required to make the fabric of the desired design. The width of the tapes is considerably less than the size of the holes 17 in the units and by impregnating and coating the textile material of the tapes, considerable stiffness is imparted to the tapes without depriving them of the desired degree of flexibility. Units and tapes or cords of other types may be employed, if desired, in which case, projections 14 of corresponding shapes are employed.

The fabric to be made may be of any desired length and width and in the fabric illustrated, the units 16 are arranged in rows extending lengthwise and crosswise of the fabric, the number of units employed in the rows and the number of rows determining the length and width of the fabric. The assembly device is provided with projections 14 corresponding to the greatest number of units to be assembled in a fabric, and it will, of course, be understood that if a fabric of smaller size is desired, units 16 will not be placed on all of the projections of the assembly device.

The fabric shown has rows of units running lengthwise and crosswise, but if it is desired to make a narrow belt or band of this fabric, only one row of units 16 may be employed and only one or more bands or tapes extending in one direction. If a fabric of substantial width as well as length is desired, the tapes 18 are passed through the longitudinal rows of units through holes in two opposite sides of the units, and other tapes 19 extending crosswise of the first mentioned tapes pass through the remaining holes of units arranged in the transverse rows.

The projections 14 are provided adjacent to the base portions thereof with shoulders 20 from which edge portions 21 extend upwardly. These edge portions are formed to engage the inner surfaces of the unit 16 as clearly shown in Figs. 2 and 3 so that the units will be correctly located on the projections. The projections may also have upwardly extending parts 22 at the corners thereof which conform approximately to the contour of the inner surfaces of the units 16 and thus serve to support these units in correct positions. The lower edges of the units may rest on the shoulders or seats 20, or if desired, the units may be supported on other parts of the projections, such as the raised portions 22. If the units are made of molded plastic material, the passages in the mold conducting the plastic material to the mold cavities may terminate at the lower edges of these cavities in which the units are formed, thus leaving a flash on the lower edges of the units, and in such cases, it is preferable to support the units on the upper surfaces of the raised portions 22 so that the lower edges of the units will be spaced from the shoulders 20. These upwardly extending or raised parts 22 are spaced apart so as to form between these projections two channels or guideways extending crosswise of each other, one of these guideways 24 being deeper than the other guideway 25.

The guideways 25 of the various projections receive the tapes which extend in one direction and which are located above the other tapes which extend in the other direction through the lower guideways 24. The bottoms of the guideways or channels 25 are provided at the ends thereof into which the leading ends of the tapes enter with upwardly inclined parts 27 which elevate the leading ends of the tapes so that they will lie on the flat or horizontal portion 28 of the channel or guideways 25 and this horizontal or flat portion 28 terminates at the deeper guideway or channel 24. At the other side of the channel 24, the guideway or channel 25 has another inclined portion 29, the lower portion of which is preferably on the level with the bottom of the lower guideway or channel 24 and slopes upwardly and terminates at the horizontal raised portion 30 of the bottom of the guideway or channel 25. These inclined parts 27 and 29 of the guideways serve mainly to eliminate shoulders on the ends of the guideways with which the leading ends of the tapes might engage and stop further movement of the tapes. These inclined parts could be replaced by curved or rounded parts which would also guide the tapes into their guideways.

The lower guideway or channel 24 which receives the tapes running at a right angle to the tapes which enter the channels 25 is provided at the end thereof into which the leading ends of the lower tapes enter with an inclined or rounded portion 32 which may deflect the leading end of a tape upwardly into the bottom 33 of the lower guideway 24.

The tapes which are commonly used for making fabrics of this type generally have their flat faces curved in one direction or another, due to having been wound on a reel. If a tape having a curvature of this kind is used, then the tape should be fed into the device so that the concave flat face of the tape is lowermost. Consequently, the leading edges of the tapes will extend slightly downward or will be yieldingly urged downwardly by the curvature of the tapes, and consequently, these tapes will engage the inclined portions 27 and 29 of the grooves 25 and the inclined portions 32 of the grooves 24. It will, of course, be understood that the flat faces 28 and 30 of the grooves 25 will be located at such a level as to normally insert the upper tapes 19 into the upper portions of the holes 17 in the units 16. The flat portion 30 of any projection, consequently, also serves to hold the tape in position to pass not only through the aperture of the unit resting upon that projection, but also into the aperture of the unit on the next adjoining projection.

It will also be noted that the flat supporting portions 28 and 30 of the guideways 25 will support the upper tapes 19 in positions above the flat base portion 33 of the lower guideways 24 so that a tape extending through a unit in one direction will not interfere with the passage of a tape through a unit in the other direction.

When the assembly device is in use with the projections suitably arranged on the base 12, the units 16 may be very easily and quickly located on the projections of the assembly device, and since the units themselves are of different appearance from the projections, as can be readily seen by inspection of Fig. 1, it is an easy matter for an operator to make sure that all of the projections desired have been covered with units. After the units have been positioned on the projections, the tapes may be readily passed through the units. Generally it is preferable to first pass the upper tapes 19 through the units, and in that case in the construction shown in Fig. 1, the tapes which have previously been cut to the desired lengths will be passed into the holes of the units along the upper edge of Fig. 1 until they have passed through all of the units. This may be quickly done by merely pushing the tapes through these units. If desired, the leading ends of the tapes may be rounded in any suitable manner so that they will more readily pass through the holes in the units. After the upper tapes have passed through all of the rows on the assembly device, the lower tapes may be passed through the units from the left-hand side of Fig. 1.

In the event that the units are of very light weight so that they might easily be moved out of their operative positions on the assembly device by the tapes, a suitable flat plate may be placed on top of the units after they have been positioned on the projections, such for example as the plate 36 illustrated in Fig. 2. Such plate, for example, may be in the form of a pane of glass which by its own weight will serve to hold the units in place, and under some conditions, may facilitate the assembling of the units. If the units are made of metal, glass or other relatively heavy materials, a plate resting on the units might be unnecessary.

The units which are to be assembled by means of bands or tapes may, of course, vary greatly in size and shape and in Figs. 5 to 8, we have illustrated by way of example a base plate 40 having projections of modified construction applied thereto to cooperate with smaller units 41 of substantially rectangular form and having holes 42 formed in the four sides thereof. With units of this type, the projections arranged on the base plate may be of different form, including shoulder portions 44 on which the lower edges of the units 41 may rest. These units may be located on the projections by means of upwardly extending or raised portions 45, the peripheries of which are such as to fit into the interior lower portions of the units 41. In this particular construction illustrated, two raised portions 45 are provided on a single base 46 and this base may be secured to the main base 40 by cement or other means, or the projections may be formed integral with the base 40. The raised portions 44 differ from those described in connection with Figs. 1 to 4, in that they do not have any guide channels for the tapes formed therein, but have flat upper surfaces and are provided at opposite sides thereof with inclined ramp-like deflecting parts 47 for the upper tapes of the fabric. The flat upper surfaces of the projections 45 form guide surfaces for the lower tapes, and these guide surfaces are provided at their ends with inclined or ramp-like parts 48 which serve to guide the lower tapes upwardly to a slight extent into the holes in the ends of the units 41. The deflecting parts 47 for the upper tapes are higher than the parts 48 of the guideways for the lower tapes and after the upper tapes have been passed through the units, they will be supported by the upper edges of the ramp-like parts 47 in elevated positions, so that the lower tapes may readily pass underneath the upper tapes. The smaller units 41 may be formed so that any flash resulting from the molding of the same will be on the bottom edges of the shorter sides of these units. Consequently, the supporting shoulders 44 for the units extend only along two sides of the raised portions 45 so that the ends of the units on which the flash may exist do not rest on any shoulders.

It is also possible to use the projections disclosed in Figs. 5 to 8 in connection with the assemblying of the larger units 16 shown in connection with Figs. 1 and 4. In order to do this, it is merely necessary to provide insert members for the lower tapes within the grooves or spaces 50 between each pair of projections 45, as shown in Figs. 9 to 11. Any suitable means for mounting inserts in the grooves 50 in such a manner that the upper surfaces of the inserts will lie substantially flush with the upper flat surfaces of the projections 45 may be provided, and in the construction shown by way of example, inserts 52 are provided which fit into these grooves or spaces 50. These inserts may be secured in place in any suitable or desired manner. In the construction illustrated, each of the bases 46 is provided in the groove or space 50 with a hole 53 and each insert is provided with an integral pin or projection 54 formed to extend into the hole and frictionally hold the insert in place. These inserts have upper flat faces 56 which form guide surfaces for the lower tapes and which are substantially flush with the upper flat surfaces of the adjacent projections. At one end each insert is provided with a downwardly inclined or rounded end portion 57 with which the leading end of the tape may engage after entering the first hole of the unit and the opposite end of each of these inserts is provided with an upwardly inclined ramp-like part 58 which deflects the leading end of the tape upwardly to a slight extent so as to guide this tape into the second hole of the unit 16 resting over the insert and into the first hole of the next adjacent unit. By means of these inserts, the projections and guide surfaces shown in Figs. 5 to 8 may readily be modified to cooperate with the larger units shown in Figs. 1 to 4.

By the use of inserts, it is also possible to provide fabrics of different patterns in which, for example, a portion of the fabric may be composed of smaller units and other portions thereof of larger units, by merely inserting the inserts into the grooves of those projections which are to be used in connection with larger units. These inserts not only serve to guide the lower tapes into the holes of the units 16, but also make it impossible for an operator to position a pair of small units on projections connected by inserts and intended for use with larger units.

By means of the assembly device shown, units of different colors may be assembled to produce various designs and the projections of the assembly device may be colored or otherwise marked to guide the operator in placing units of the correct colors on the projections. Furthermore, the design can readily be checked for correct positioning of the units before the tapes are passed through the units, since the units are all clearly visible.

By means of the assembly device described, the units can very easily be assembled in correct relation to each other and the tapes may then be quickly passed through the holes of the units by means of the guide surfaces of the projections so that fabrics of this kind can be very quickly assembled.

The term "tape" is herein employed to designate any tape, cord, thread, or band that may be employed for assembling the units into a fabric.

It will be understood that various changes in the details, materials and conditions which have been herein above described in order to explain the nature of the invention may be made by those skilled in the art within the principle and scope

We claim as our invention:

1. A device for use in assembling a fabric composed of relatively rigid units connected by tapes which pass lengthwise and crosswise of said fabric through apertures in the sides of said units, said device including a base, a plurality of projections secured to said base and extending upwardly therefrom, said projections being of elongated form and being arranged in pairs secured to each other at their lower portions and having the upper portions thereof spaced apart, forming spaces to receive parts of substantially rectangular units with apertures on the four sides thereof, guide surfaces on said projections for guding the leading ends of the tapes through the apertures of said units, and inserts formed to be positioned in said spaces between the upper portions of the projections of each pair of projections and having their upper surfaces formed to act as guides for tapes when larger units are to be assembled of a size to engage a pair of projections.

2. A device for use in assembling a fabric composed of relatively rigid units connected by tapes which pass lengthwise and crosswise of said fabric through apertures in the sides of said units, said device including a base, a plurality of projections secured to said base and extending upwardly therefrom, said projections being of elongated form and being arranged in pairs secured to each other at their lower portions and having the upper portions thereof spaced apart, forming spaces to receive parts of substantially rectangular units with apertures on the four sides thereof, guide surfaces on said projections for guiding the leading ends of the tapes through the apertures of said units, and inserts formed to be positioned in said spaces between the upper portions of the projections of each pair of projections and having their upper surfaces formed to act as guides for tapes when larger units are to be assembled of a size to engage a pair of projections, each of said inserts being provided at one end thereof with an upwardly inclined ramp-like part for engaging the leading end of the tape and deflecting it upwardly through an aperture of a unit.

ROBERT N. YOUNGBLOOD.
EDWARD W. ERRICK.

REFERENCES CITED

The following references are of record in the file of this patent:

UNITED STATES PATENTS

| Number | Name | Date |
|---|---|---|
| 1,678,966 | Whiting | July 31, 1928 |
| 2,226,440 | Parker | Dec. 24, 1940 |
| 2,368,720 | Mitchko | Feb. 6, 1945 |